(12) United States Patent
Muto et al.

(10) Patent No.: US 6,343,407 B1
(45) Date of Patent: Feb. 5, 2002

(54) HOSE CLIP

(75) Inventors: Mineo Muto; Yuji Nakamura, both of Aichi (JP)

(73) Assignee: Togo Seisakusyo Corporation, Aichi (JP)

( * ) Notice: Subject to any disclaimer, the term of this patent is extended or adjusted under 35 U.S.C. 154(b) by 0 days.

(21) Appl. No.: 09/474,814

(22) Filed: Dec. 29, 1999

(30) Foreign Application Priority Data

| May 7, 1999 | (JP) | ............................................ 11-127611 |
| Oct. 29, 1999 | (JP) | ............................................ 11-308597 |

(51) Int. Cl.⁷ ............................................. B65D 63/02
(52) U.S. Cl. .................. 24/20 R; 24/20 S; 24/20 CW; 24/20 EE
(58) Field of Search ........................... 24/20 R, 20 CW, 24/20 S, 20 EE

(56) References Cited

U.S. PATENT DOCUMENTS

| 4,930,191 A | * | 6/1990 | Takahashi et al. .......... 24/20 R |
| 4,930,192 A | | 6/1990 | Muhr |
| 5,185,907 A | | 2/1993 | Kawashima et al. |
| 5,664,295 A | | 9/1997 | Kume et al. |
| 5,855,044 A | * | 1/1999 | Cradduck ................... 24/20 R |
| 5,979,020 A | * | 11/1999 | Kimura et al. .............. 24/20 R |
| 6,038,744 A | | 3/2000 | Zielinski |

FOREIGN PATENT DOCUMENTS

| DE | 43 05 649 | 9/1994 |
| JP | 7-243411 | 9/1995 |
| JP | 8-178155 | 7/1996 |
| JP | 10-61855 | 3/1998 |
| JP | 11-201119 | 7/1999 |

* cited by examiner

*Primary Examiner*—Victor N. Sakran
(74) *Attorney, Agent, or Firm*—Wenderoth, Lind & Ponack, L.L.P.

(57) ABSTRACT

A hose clip for clamping a hose includes a clamping body formed by bending a band-shaped spring plate into a circular form. A frame-shaped first grip is formed at one end of the body so as to protrude radially outward, and a second grip is formed at the other end of the body so as to protrude radially outward and so as to oppose the first grip when moved through an inside of the first grip. A locking protrusion protrudes from the first grip toward the second grip, and a locking opening is formed in the second grip so as to be engaged with the protrusion. When the protrusion engages the locking opening, the first and second grips are held close to each other such that the body is held in a spread state. The protrusion disengages from the locking opening when the first and second grips are displaced radially relative to each other. The first grip defines a releasing space below the protrusion so that a releasing tool is penetrated through the releasing space at the first grip side to release the protrusion from engagement with the locking opening. The locking opening includes a rectangular opening section formed in the second grip. The protrusion projects outward through the opening while engaging the locking opening.

30 Claims, 18 Drawing Sheets

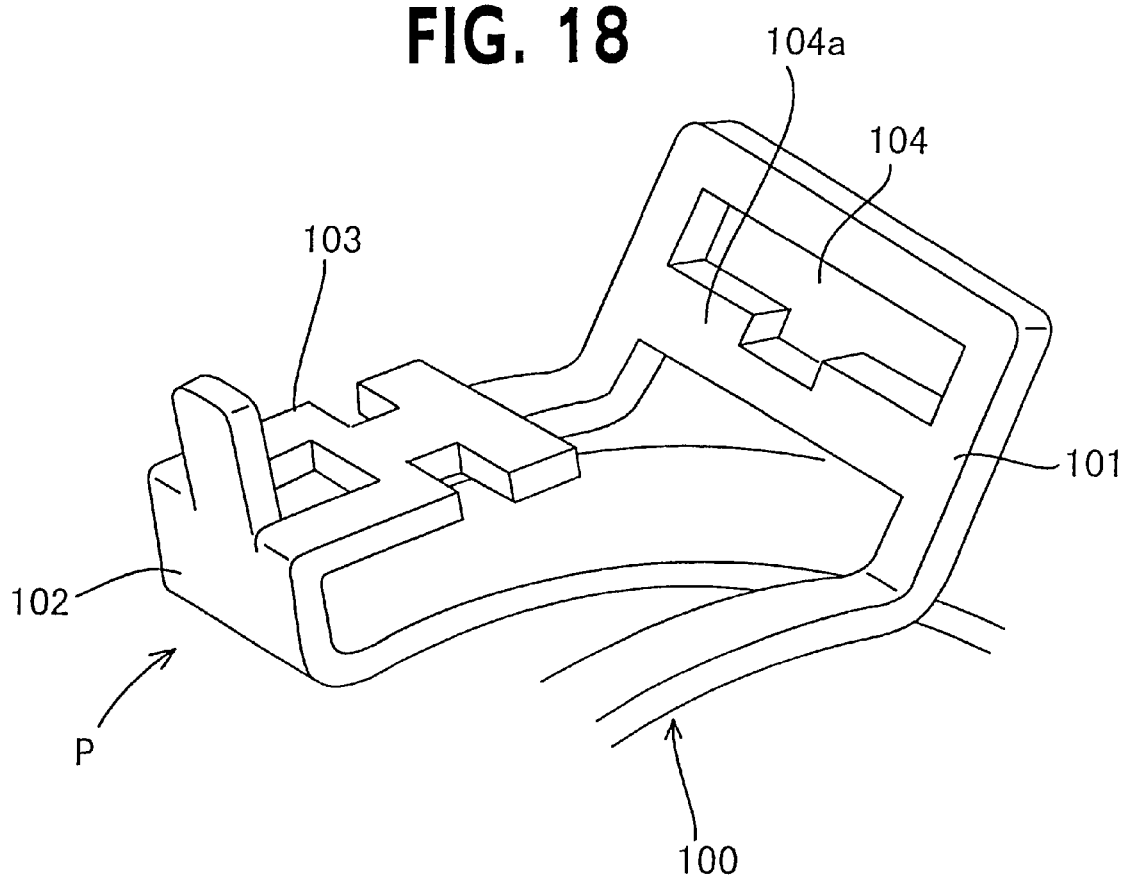

HOSE CLIP

BACKGROUND OF THE INVENTION

1. Field of the Invention

This invention relates to a hose clip clamping a hose end, and more particularly to such a hose clip of the holderless type including a clamping body which is previously held in a spread state.

2. Description of the Prior Art

Hose clips have conventionally been provided which deform by an inherent spring force into a reduced state or a clamping state to thereby clamp a hose end. When the hose clip is previously held in a spread state, a clamping work can readily be carried out at a job site where the hose clips are used. Accordingly, a holder is conventionally used to hold grips at both ends of the hose clip so that the hose clip is held in the spread state. However, when the holder is pulled out so that the hose clip is released from the spread state, the spring force of the hose clip ejects the holder. As a result, the job site is littered with a large number of holders. In view of this problem, the use of holders has recently been eliminated, and hose clips of the holderless type have been provided. This type of the hose clip has been provided with a function of holding itself in the spread state.

For example, FIG. 18 illustrates one of the hose clips of the holderless type disclosed by Japanese Utility Model Registration No. 2560663. The disclosed hose clip comprises a circularly bent clamping body 100 formed with a generally frame-shaped first grip 101 at one of two ends thereof and a one-legged second grip 102 at the other end thereof. The second grip 102 has a distal end from which a locking protrusion 103 extends toward the first grip 101. The first grip 101 is formed with a locking opening 104 which cooperates with the protrusion 103. Both grips 101 and 102 are held with a pair of pliers so that the grips come close to each other, whereupon a distal end of the protrusion 103 is inserted into the opening 104 and rubs an opening edge of the opening. In this stage, the grips 101 and 102 are slightly displaced up and down relative to each other. When the body 100 is spread such that a predetermined diameter is reached, a narrow portion 103a of the protrusion 103 engages a lower recess 104b of the opening 104, so that the body 100 is held in the spread state.

The protrusion 103 is disengaged upward from the recess 104b of the opening 104 in order that the body 100 of the hose clip may be released from the spread state. For this purpose, the pliers are applied to the body 100 from the direction opposite arrow P in FIG. 18 to thereby hold the grips 101 and 102 so that the grips are moved up and down, whereby the body is released from the spread state.

A sufficient working space cannot sometimes be ensured when the hose clip is used in a narrow space such as an engine room of an automobile. In this case, the direction in which a releasing tool such as the pliers is applied to the hose clip is limited. In view of this problem, the hose clip is desired to have less limitation of the direction in which the releasing tool is applied thereto. In the above-described conventional hose clip, however, the rear of the second grip 102 disturbs the releasing work when the releasing tool is applied to the body in the direction of arrow P. This results in a limitation in a place where the hose clip is used. Thus, the above-described hose clip necessitates an improvement in its usability.

Furthermore, the above-described conventional hose clip has another problem. More specifically, when the hose clip is manufactured, the second grip 102 is caused to pass through a hole 101a defined inside the first grip 101 so that the grips are opposed to each other in a crossed state. However, the locking opening 104 is open at the first grip 101 side and the narrow portion 103a of the protrusion 103 engages the lower recess 104b of the opening. Accordingly, a lower edge 104a of the opening 104 is an obstacle to the second grip 102 passing through the hole 101a of the first grip 101. In order that this may be avoided, an upper end of the second grip 102 needs to be pushed lower than the edge 104a of the opening 104 such that the second grip 102 needs to be deformed to a large extent. This reduces the manufacturing efficiency of the hose clip.

SUMMARY OF THE INVENTION

Therefore, an object of the present invention is to provide a hose clip which can increase the freedom in the direction in which the releasing tool is applied thereto and can improve the manufacturing efficiency.

The present invention provides a hose clip for clamping a hose, comprising a clamping body formed by bending a band-shaped spring plate into a generally circular form having two ends, and the body clamps the hose when the body deformed into a reduced state by an inherent spring force thereof. A generally frame-shaped first grip is provided at one end of the body so as to protrude radially outward with respect to the body, and a second grip is provided at the other end of the body so as to protrude radially outward and so as to oppose the first grip when moved through an inside of the first grip. A locking protrusion protrudes from the first grip toward the second grip, and a locking opening is formed in the second grip so as to be engaged with the locking protrusion. In the hose clip, when the locking protrusion engages the locking opening, the first and second grips are caused to come close to each other such that the body is held in a spread state. The locking protrusion disengages from the locking opening when the first and second grips are displaced radially relative to each other. The frame-shaped first grip defines a releasing space below the locking protrusion so that a releasing tool can penetrate through the releasing space at the first grip side to release the locking protrusion from engagement with the locking opening. The locking opening includes a main opening section formed through the second grip, the protrusion projects outward through the main opening section while engaging the locking opening.

When the body of the above-described hose clip is held in the spread state, the first and second grips are caused to come close to each other so that the protrusion engages the locking opening. Since the body is held in the spread state, the body or the hose clip can readily be fitted with the hose end. Since a sufficient clearance is defined between the hose clip and the hose, the fitting can readily be carried out. The hose clip is released from the spread state after the hose is connected to a pipe etc.

The releasing tool can be inserted through the releasing space when inserted from the first grip side. Accordingly, the releasing tool can be caught by both of the first and second grips. In this state, the releasing tool is operated so that the grips are displaced in the radially opposite directions respectively, whereupon the protrusion is released from the engagement with the locking opening. Consequently, the body of the hose clip returns to its reduced state, thereby clamping the connected portion of the hose.

When the releasing tool is inserted from the second grip side, the protrusion engages the locking section with its distal end projecting from the locking section. Accordingly, the releasing tool can be caught by this portion of the protrusion and the second grip. In this state, the releasing tool is operated so that the grips are displaced in the radially opposite directions respectively, whereupon the protrusion is released from the engagement with the locking section. Thus, when the releasing tool is inserted from either grip side, the hose clip can be released from the spread state, so that the usability of the hose clip can be improved.

The locking protrusion preferably has a proximal end provided at an upper side of the first grip and has in an inside thereof a hole extending downward and open downward. Since the inside of the first grip is open downward, the second grip is only pushed downward to a location where it does not interfere with the locking protrusion when the second grip is caused to pass through the hole inside the first grip in the manufacture of the hose clip. Consequently, an amount of deformation of the second grip can be reduced.

BRIEF DESCRIPTION OF THE DRAWINGS

Other objects, features and advantages of the present invention will become clear upon reviewing the following description of the preferred embodiments, made with reference to the accompanying drawings, in which:

FIG. 18 is a view similar to FIG. 3, showing a prior art construction.

DETAILED DESCRIPTION OF THE PREFERRED EMBODIMENTS

Figure 1:
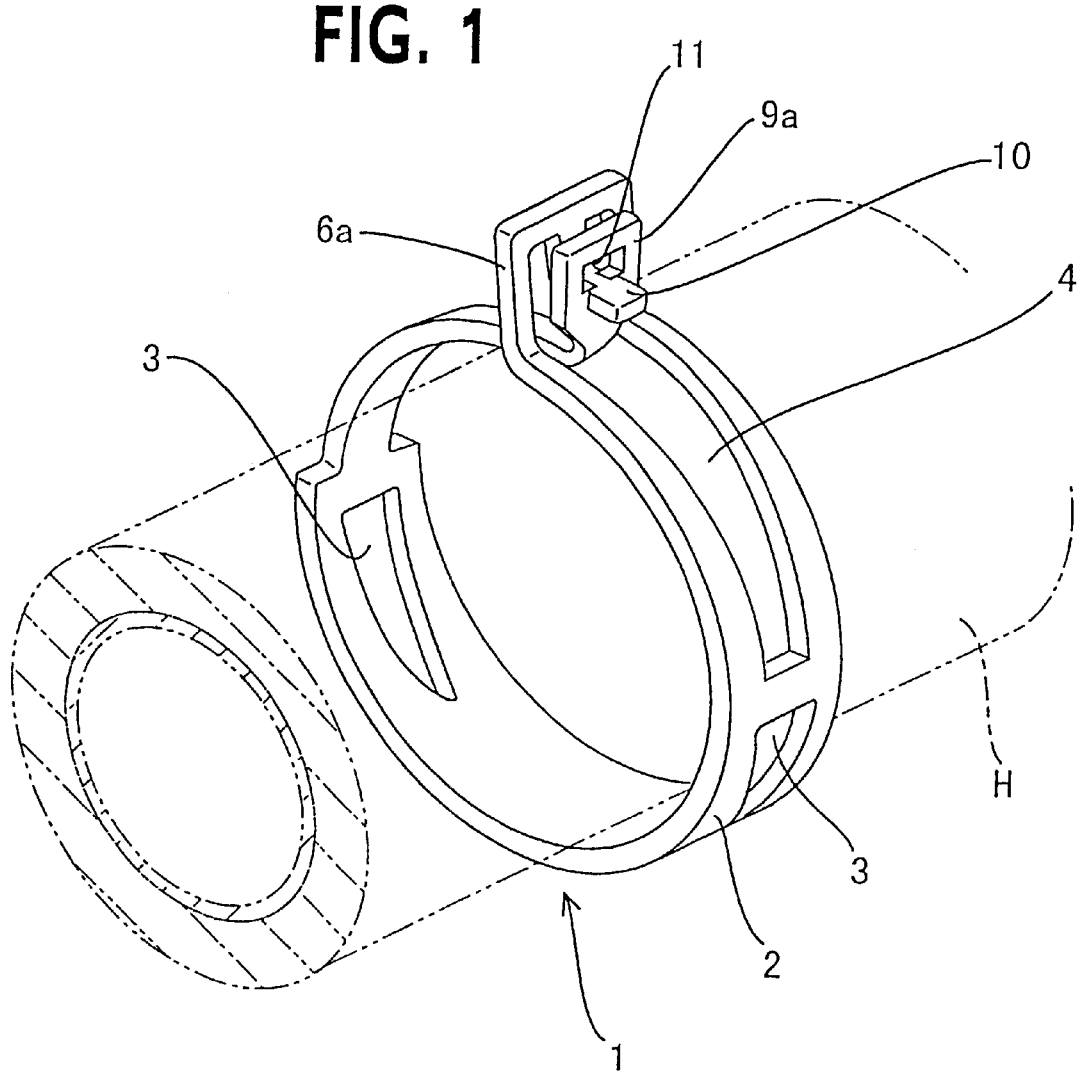
FIG. 1 is a perspective view of the hose clip of a first embodiment in accordance with the present invention in the spread-open state.

A first embodiment of the hose clip in accordance with the present invention will be described with reference to FIGS. 1 to 8. The hose clip of the first embodiment is used to clamp a joint of a hose H and a pipe P as shown in FIG. 1.

Figure 2:
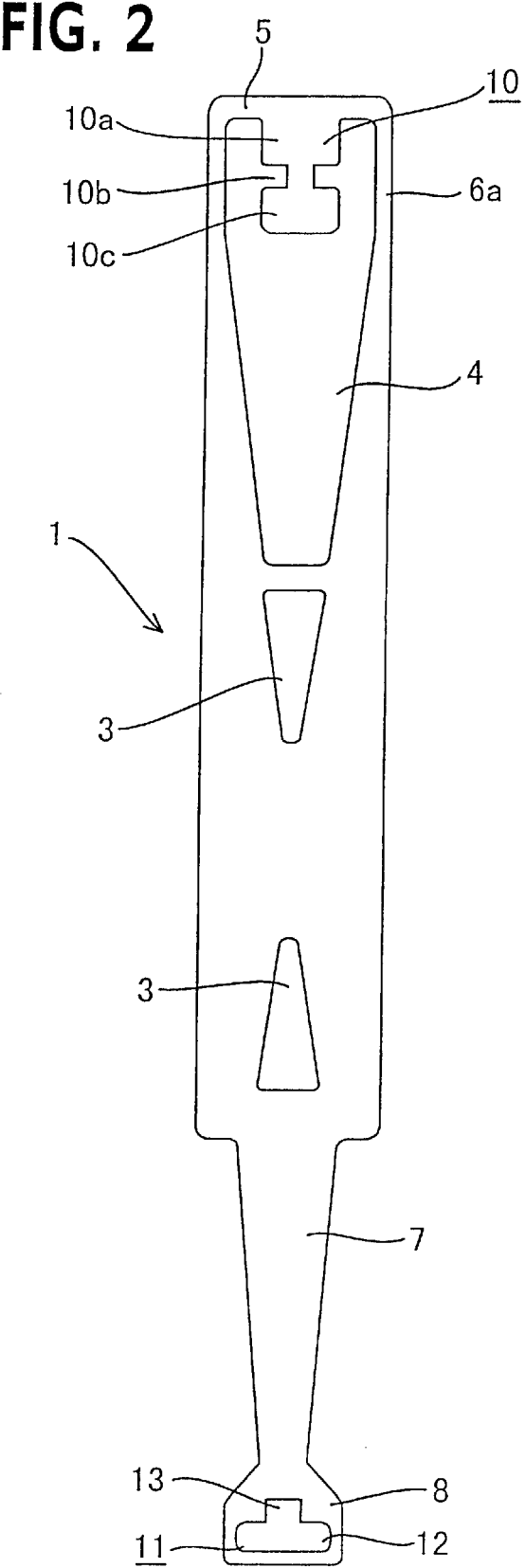
FIG. 2 is a development view of the hose clip.

The hose clip 1 comprises a clamping body 2 formed by bending a band-shaped spring plate into a generally circular form. The body 2 has two generally triangular holes 3 serving so that the body applies a substantially uniform clamping force to an overall circumference of the hose H. The body 2 has two ends and includes a connecting portion 5 at a first end thereof and a hole 4 as shown in FIG. 2. A width of the hole 4 is gradually reduced toward the triangular hole 3. The hole 4 includes a portion adjacent to the connecting portion 5 and having a uniform width over a predetermined length. The portion with the uniform width is raised radially outward to serve as a generally rectangular frame-shaped first grip 6a.

Figure 3:
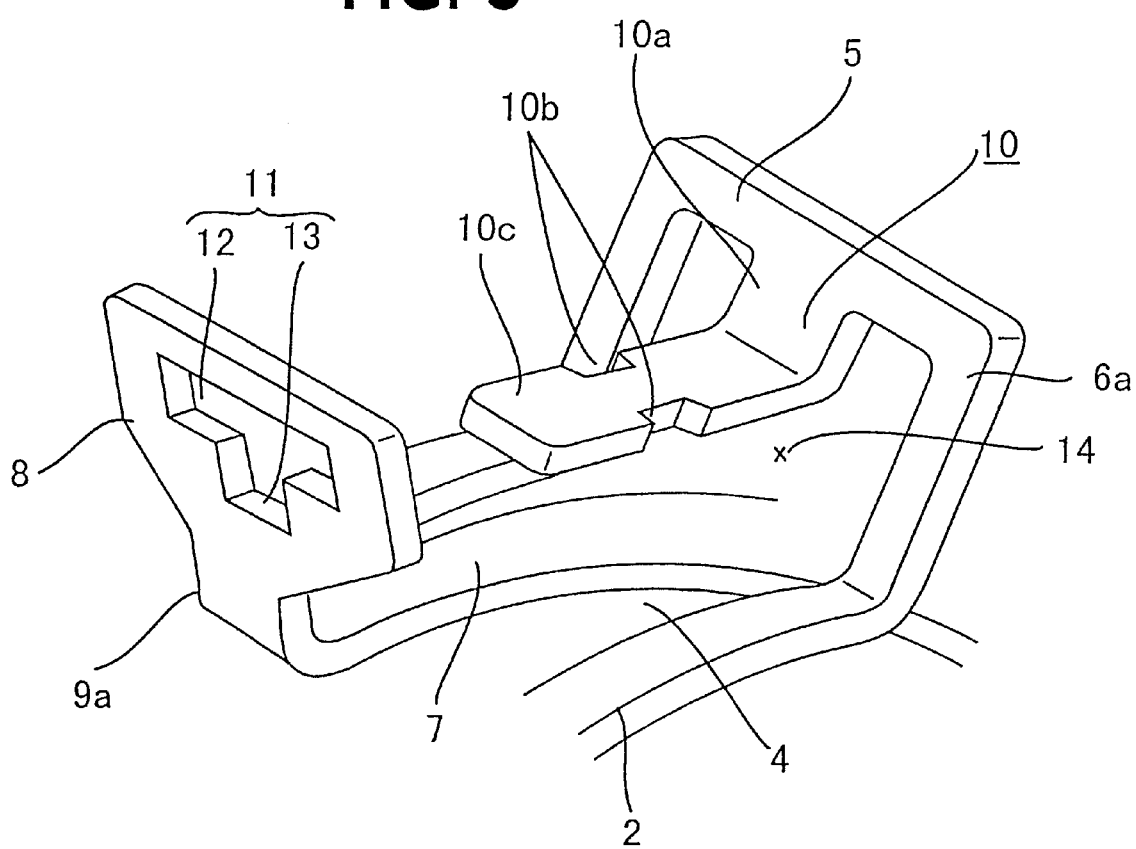
FIG. 3 is a partial enlarged perspective view of the hose clip.
Figure 4:
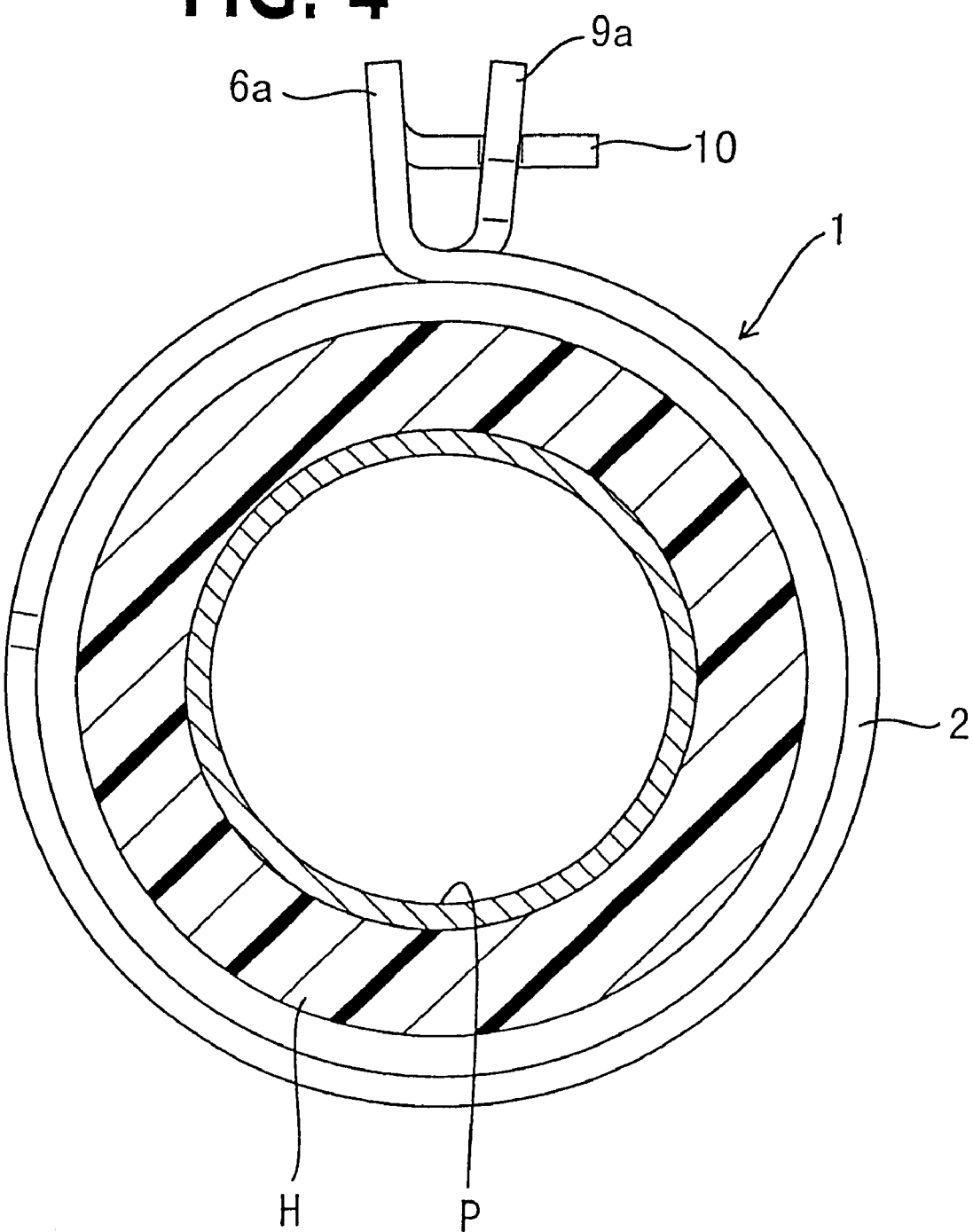
FIG. 4 is a sectional view of the hose clip in the spread state.
Figure 5:
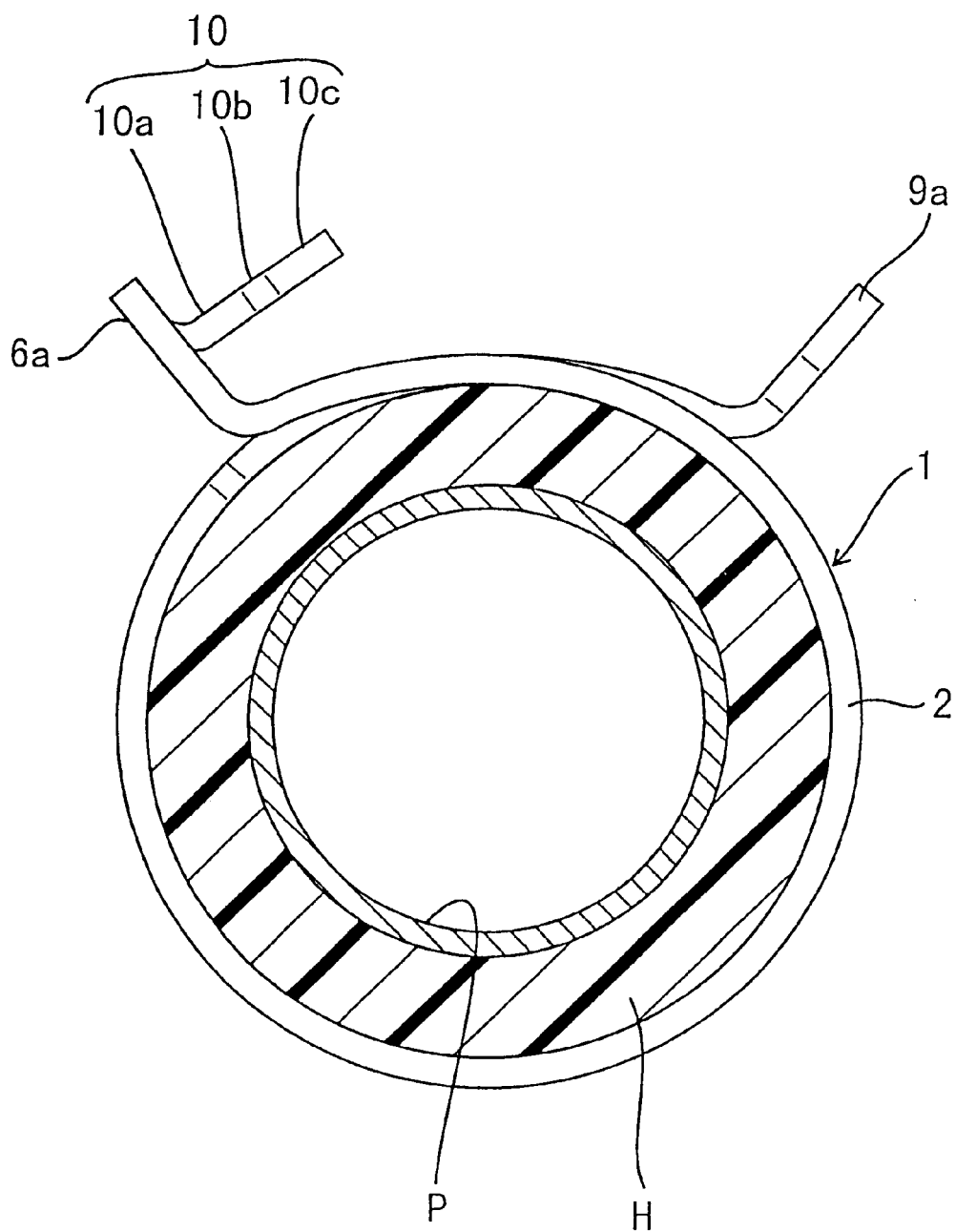
FIG. 5 is a sectional view of the hose clip clamping the hose.
Figure 6:
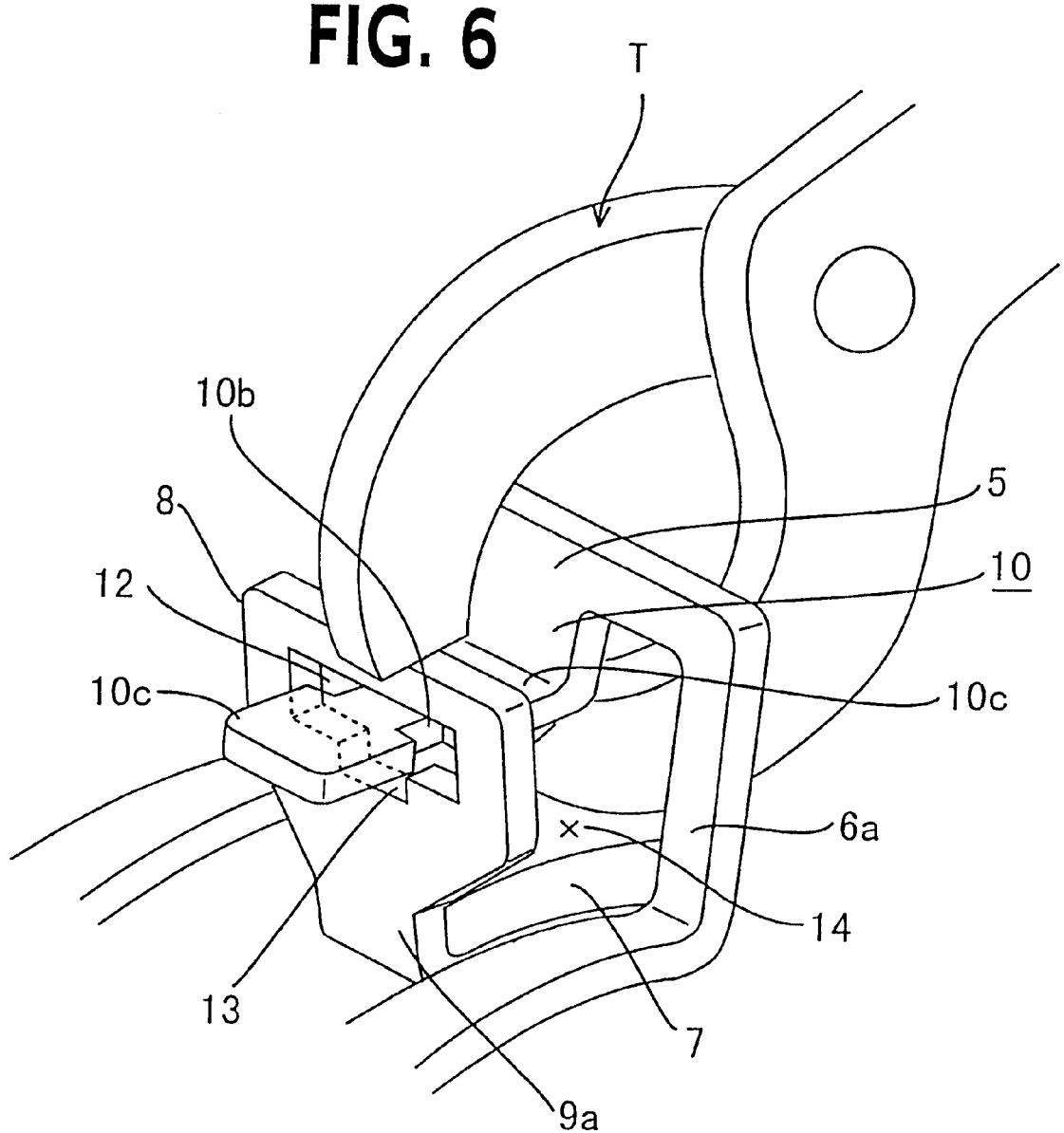
FIG. 6 is a partial perspective view of the engaging protrusion engaging the recess, showing the work for releasing the hose clip from the spread-open state.

Further referring to FIG. 2, the body 2 includes a narrow portion 7 at the second end thereof. The length of the narrow portion 7 is approximately equal to that of the hole 4. The narrow portion 7 has such a width as to be inserted into the hole 4 so that the narrow portion is not displaced radially relative to the hole 4 as shown in FIGS. 1 and 3. The narrow portion 7 has a distal end formed with a generally rectangular wide portion 8 as shown in FIG. 2. The narrow portion 7 passes through the uniform width portion of the hole 4 of the first grip 6a and is subsequently raised radially outward into a second grip 9a. The second grip 9a has the same height as the first grip 6a. The wide portion 8 of the second grip 9a is provided with a locking opening 11 for holding the body 2 in a spread state as shown in FIG. 3. The locking opening 11 includes a rectangular main opening 12 formed in the wide portion 8 so as to be long sideways, and a narrow rectangular recess 13 formed in a central lower edge of the main opening 12.

The first grip 6a includes a locking protrusion 10 for engaging with and disengaging from the recess 13. The protrusion 10 includes a base 10a continuous to the central portion of the connecting portion 5. A root portion of the base 10a is bent perpendicularly toward the second grip 9a. A portion of the protrusion 10 slightly in the rear of the distal end thereof is notched at both sides thereof and a resultant narrow portion serves as a throat 10b. The throat 10b has a width smaller than the recess 13 so as to be fitted in the latter. When the throat 10b is fitted in the recess 13, tab portion 10c formed on the distal end of the protrusion 10 is caught by the recess 13 such that the two grips 6a and 9a engage each other, whereupon the body 2 is held in the spread state. Since the inwardly extending protrusion 10 is raised and bent in the above-described construction, a releasing opening 14 through which a releasing tool T such as pliers is inserted is defined below the protrusion 10.

The second grip 9a has a guiding incline or chamfered portion in a lower edge of the main opening 12 opposed to the first grip 6a. The incline serves to guide the tab portion 10c of the protrusion 10 when the grips 6a and 9a are caused to come close to each other. Thus, the overall first grip 6a is smoothly displaced radially outward. The same effect can be achieved when the distal end of the tab portion 10c of the protrusion 10 is bent obliquely upward.

The operation of the hose clip will now be described. The body 2 of the hose clip 1 is held in the spread state before the hose clip is attached to the hose H. For this purpose, the upper ends of the grips 6a and 9a of the hose clip 1 in the free or spread state are held with the tool T such as the pliers so that the upper ends are caused to come close to each other. As a result, the tab portion 10c of the protrusion 10 enters the main opening 12 of the second grip 9a and is guided by the incline of the lower edge of the main opening 12, whereupon the first grip 6a side is displaced radially outward relative to the second grip 9a. When the tab portion 10c passes through the main opening 12, the throat 10b is fitted into the recess 13 such that the inherent spring force of the body 2 resolves the relative displacement between the first and second grips 6a and 9a. Consequently, the throat 10b engages the recess 13 so that the body 2 is held in the spread state.

The hose clip 1 with the body 2 thus held in the spread state is carried to a job site where the hose H is connected to the pipe P. At the job site, the body 2 of the hose clip 1 in the spread state is suitably fitted with an end of the hose H as shown in FIG. 1. In this state, the hose H is fitted with the pipe P and the hose clip 1 is located at a predetermined clamping position.

The release of the hose clip 1 from the spread state will now be described. In one manner, when the pliers approach from the first grip 6a side or from the right of the first grip as viewed in FIG. 6, one of the jaws of the pliers is inserted through the releasing space 14 to be applied to the backside of the protrusion 10. The other jaw is applied to the upper end of the second grip 9a. When the pliers are gripped in this state, the first grip 6a side is displaced upward, whereas the second grip 9a side is displaced downward. As a result, the throat 10b is caused to disengage from the recess 13 such that the inherent spring force of the body 2 deforms the body into the reduced or clamping state. Consequently, the body 2 of the hose clip 1 clamps the hose H and the pipe P.

Figure 7:
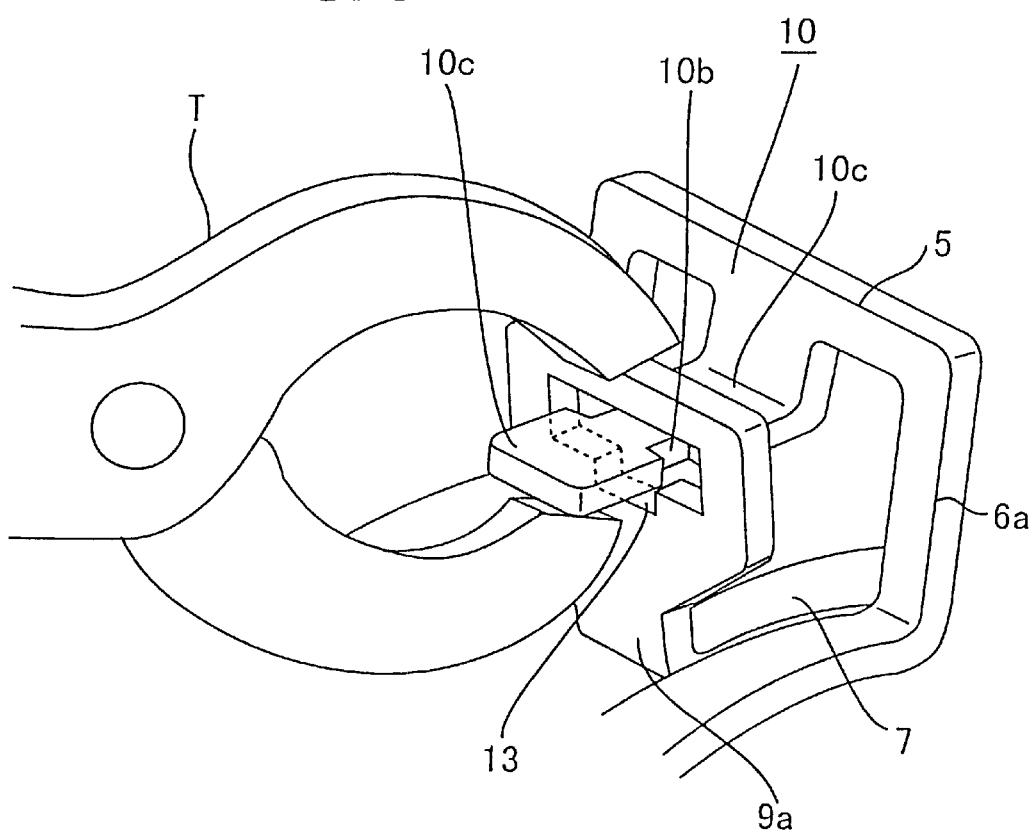
FIG. 7 is also a partial perspective view of the locking protrusion engaging the locking opening, showing one manner of the work for releasing the hose clip from the spread state.

In another manner, when the pliers are caused to approach from the second grip 9a side or from the left of the second grip as viewed in FIG. 7, one of the jaws of the pliers is applied to the backside of the tab portion 10c, whereas the other jaw is applied to the upper end of the second grip 9a. The throat 10b is disengaged from the recess 13 when the pliers are gripped so that the grips 6a and 9a are moved up and down respectively.

Figure 8:
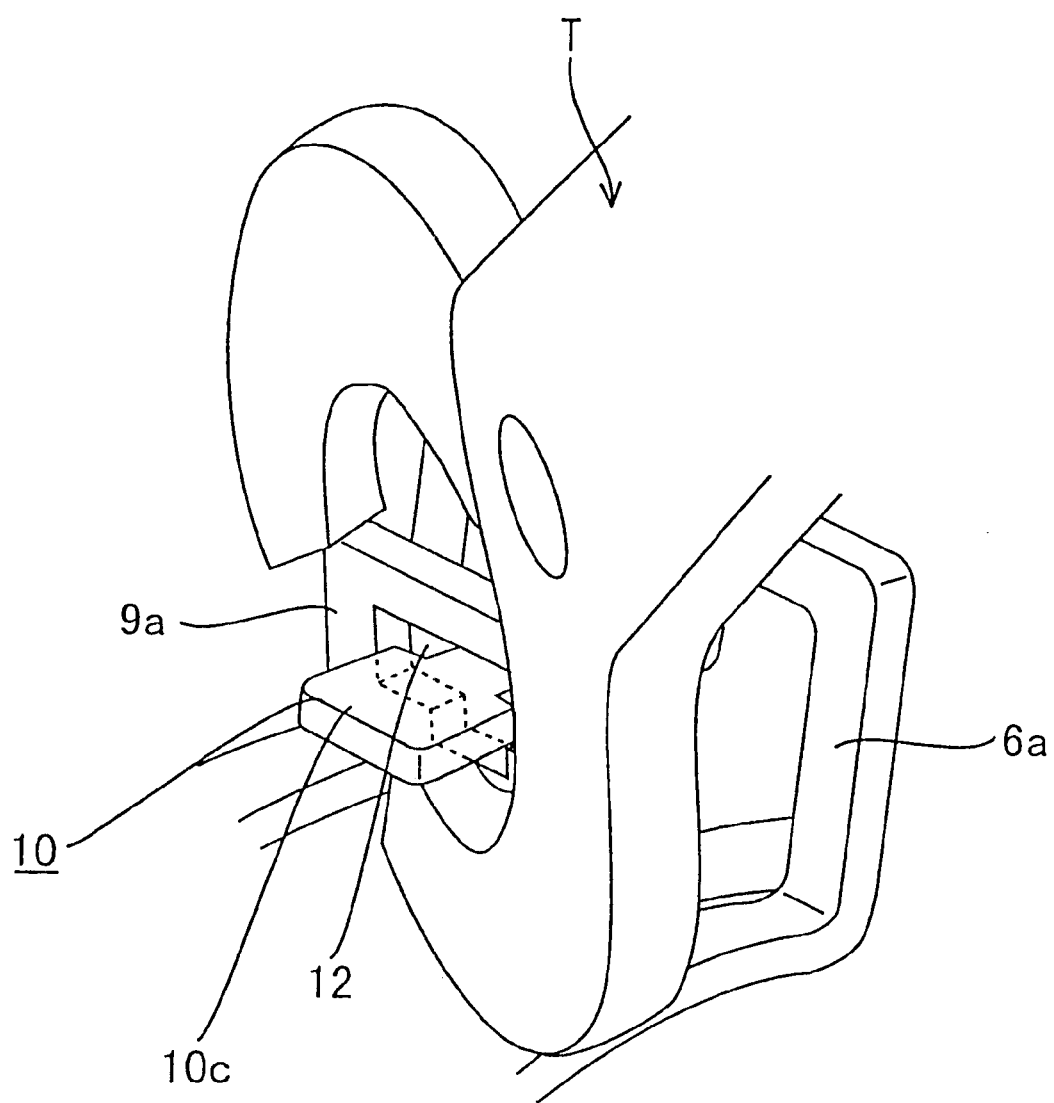
FIG. 8 is also a partial perspective view of the protrusion engaging the opening, showing another manner of the work for releasing the hose clip from the spread state.

In further another manner, when the pliers are caused to approach axially with respect to the body 2 as shown in FIG. 8 or in the direction generally perpendicular to the direction shown in FIG. 7, one of the jaws of the pliers is applied to the backside of the tab portion 10c, whereas the other jaw is applied to the upper end of the second grip 9a. The throat 10b is disengaged from the recess 13 when the pliers are gripped so that the grips 6a and 9a are moved up and down, respectively. The body 2 can also be released from the spread state when the pliers are caused to approach in the direction opposed to that shown in FIG. 8.

According to the above-described hose clip, the body 2 of the hose clip 1 can be released from the spread state even when the releasing tool T approaches from the second grip 9a side although this is impossible in the prior art hose clip as shown in FIG. 18. More specifically, the body 2 can be released from the spread state when the tool T approaches from the first grip 6a side, the second grip 9a side and axially with respect to the body. Consequently, the usability of the hose clip can be improved. Further, an open space is defined below the protrusion 10 inside the first grip 6a. Accordingly, when the second grip passes through the hole 4 inside the first grip in the manufacture of the hose clip, the second grip 9a is only pushed downward to a location where it does not interfere with the engaging protrusion 10. Consequently, the manufacture of the hose clip can be simplified since an amount of deformation of the second grip 9a is reduced.

Figure 9:
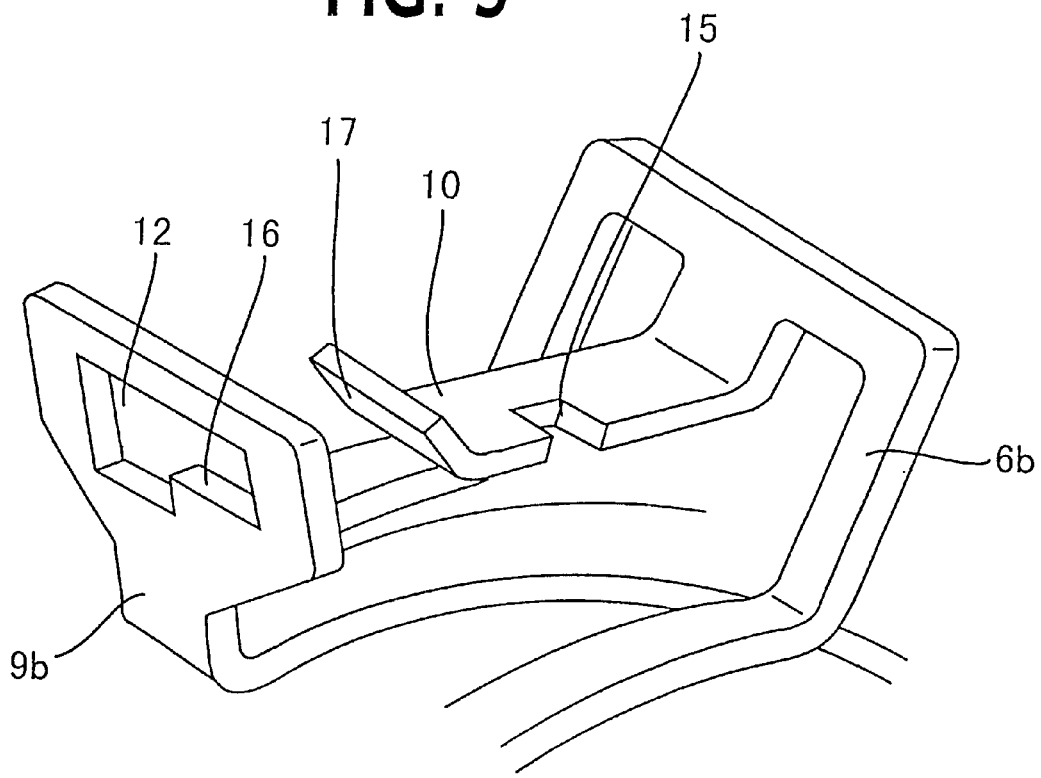
FIG. 9 is a view similar to FIG. 3, showing the hose clip of a second embodiment in accordance with the invention.

The following describes modified forms of the locking or engaging structure between the locking protrusion and the locking section. FIG. 9 shows a second embodiment of the invention. Although the protrusion 10 has two notches in both sides thereof respectively in the first embodiment, a single notch 15 is formed in one side of the protrusion 10 in the second embodiment. The second grip 9a has a projection 16 formed on one end of the lower edge of the opening 12. The notch 15 engages and disengages from the projection 16. Further, the distal end or the tab portion of the protrusion 10 is bent obliquely upward to thereby serve as a guide edge 17. The guide edge 17 smooths the engagement of the protrusion 10, namely, the distal end of the protrusion 10 smoothly enters the opening 12 and passes therethrough. The other construction of the hose clip of the second embodiment is the same as that of the first embodiment and accordingly, the same effect can be achieved from the second embodiment as from the first embodiment.

Figure 10:
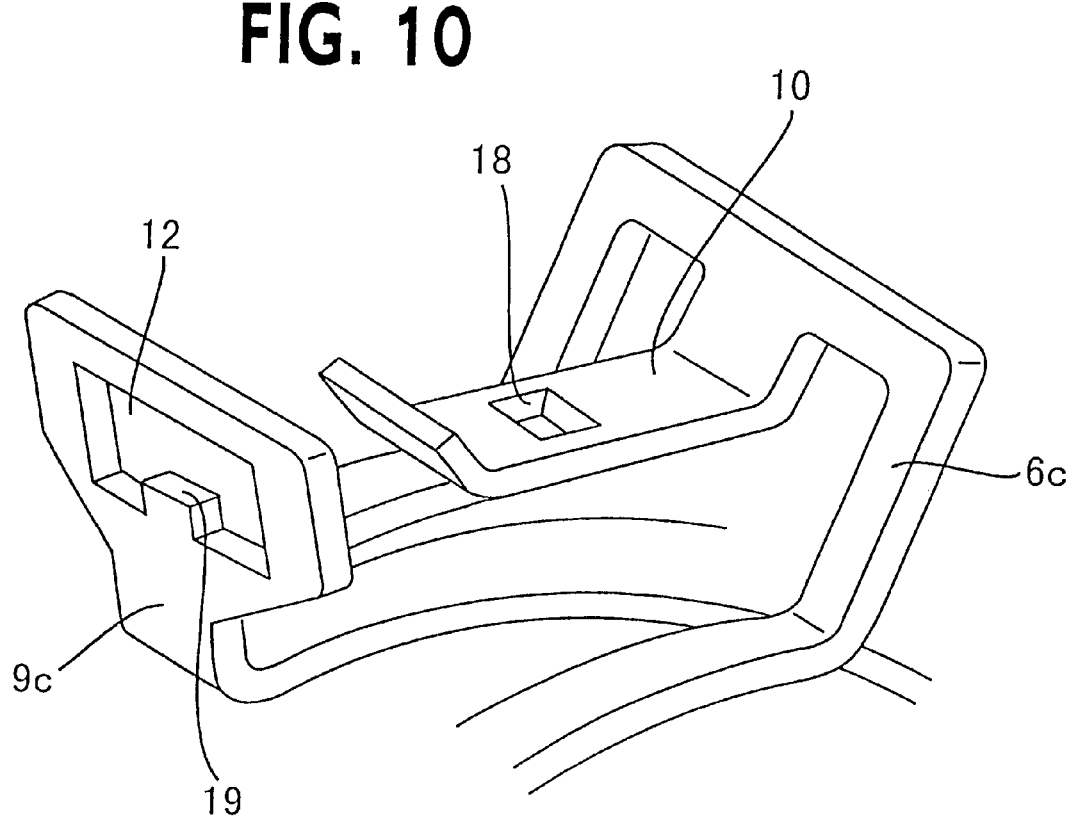
FIG. 10 is a view similar to FIG. 3, showing the hose clip of a third embodiment in accordance with the invention.

FIG. 10 shows a third embodiment of the invention. The protrusion 10 has a through hole 18 formed in the middle thereof. The second grip 9a has a projection 19 formed on the central lower edge of the locking opening 12. The projection 19 engages and disengages from the hole 18. The remaining construction of the hose clip of the third embodiment is the same as that of the first embodiment and accordingly, the same effect can be achieved from the third embodiment as from the first embodiment.

Figure 11:
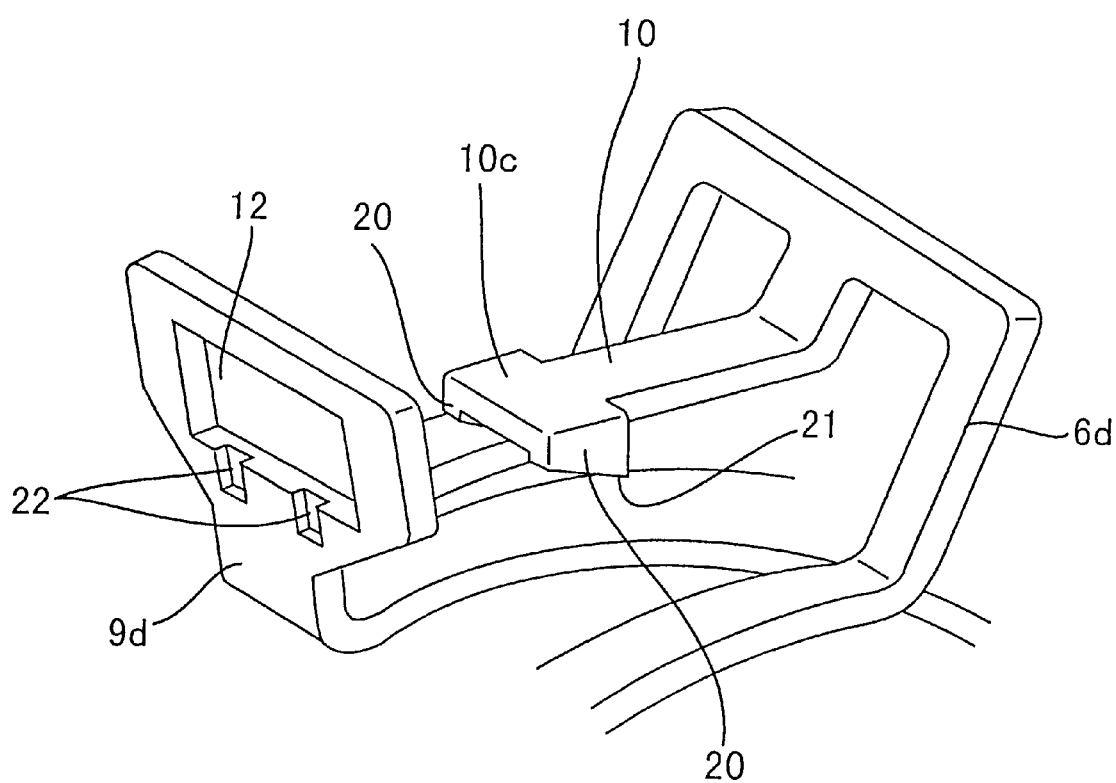
FIG. 11 is a view similar to FIG. 3, showing the hose clip of a fourth embodiment in accordance with the invention.

FIG. 11 shows a fourth embodiment of the invention. The protrusion 10 has a pair of downwardly extending hooks 20 formed on both sides of the tab portion 10c thereof. Each of the hooks 20 has a lower end inclined so that a width thereof is gradually reduced toward the distal end of the protrusion 10. Thus, the lower edge of each hook 20 serves as an inclined portion 21. The inclined portions 21 smoothen the engagement of the protrusion 10, namely, the distal end of the protrusion 10 smoothly enters the opening 12 and passes therethrough. Further, the second grip 9d has a pair of grooves 22 formed in an outer side of a central lower edge of the opening 12. The hooks 20 engage and disengage from the grooves 22, respectively. The remaining construction of the hose clip of the fourth embodiment is the same as that of the first embodiment and accordingly, the same effect can be achieved from the fourth embodiment as from the first embodiment.

Figure 12:
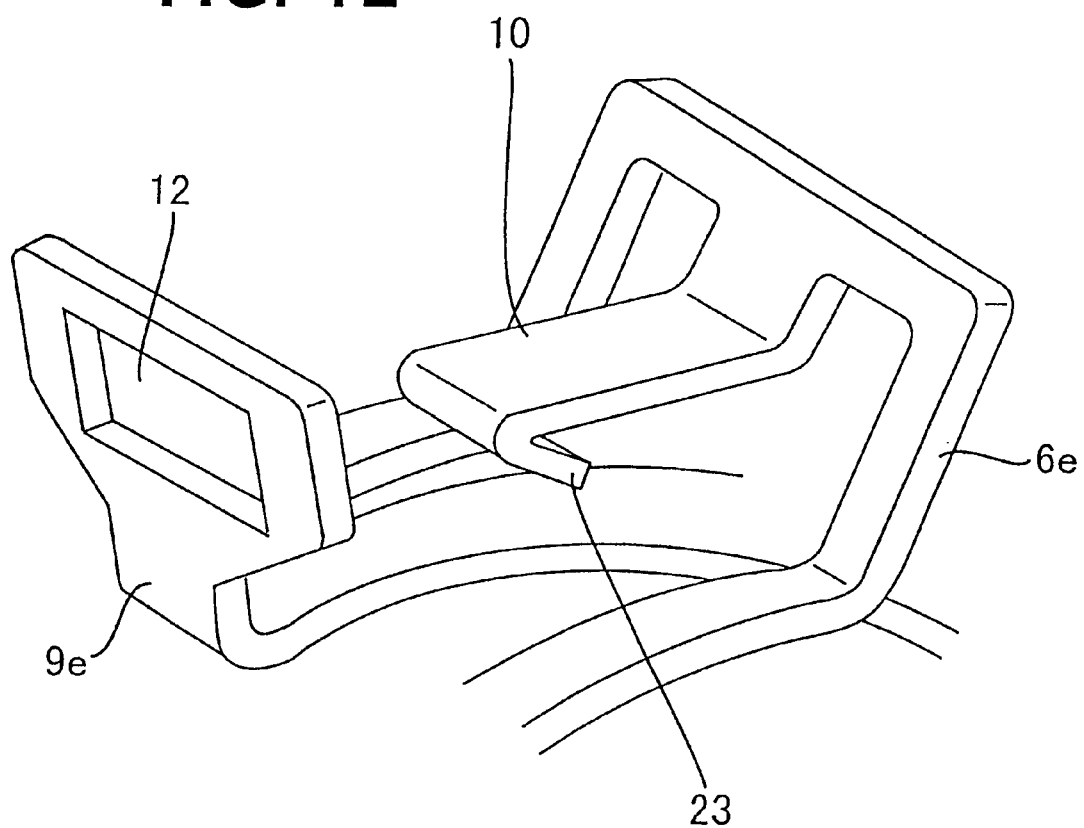
FIG. 12 is a view similar to FIG. 3, showing the hose clip of a fifth embodiment in accordance with the invention.

FIG. 12 shows a fifth embodiment of the invention. In the fifth embodiment, the distal end of the protrusion 10 is folded obliquely downward so as to be formed with a spring strip 23 flexing slightly upward and downward. The spring strip 23 guides the engagement of the protrusion 10, and engages and disengages from the outer lower edge of the opening 12 of the second grip 9e. The remaining construction of the hose clip of the fifth embodiment is the same as that of the first embodiment and accordingly, the same effect can be achieved from the fifth embodiment as from the first embodiment.

Figure 13:
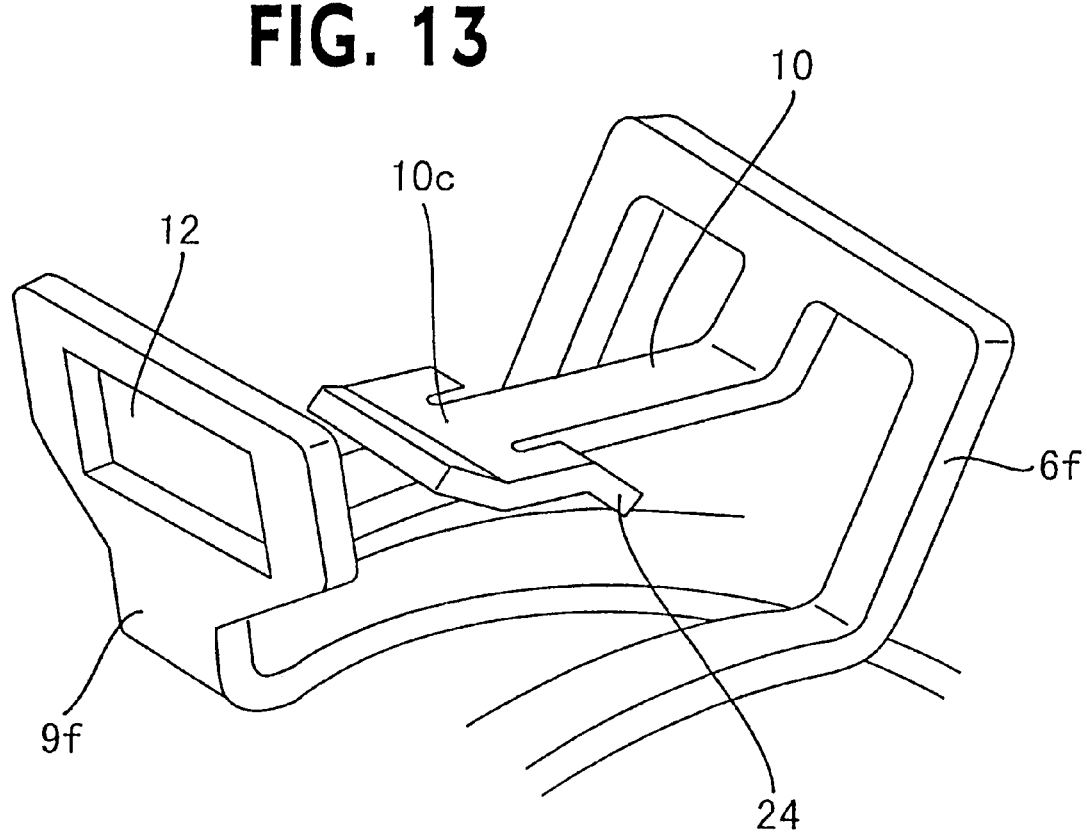
FIG. 13 is a view similar to FIG. 3, showing the hose clip of a sixth embodiment in accordance with the invention.

FIG. 13 shows a sixth embodiment of the invention. In the sixth embodiment the rear edge of the tab portion 10c of the protrusion 10 is bent downward to be formed into a pair of claws 24 engaging and disengaging from the lower edge of the opening 12 of the second grip 9f. The remaining construction of the hose clip of the sixth embodiment is the same as that of the first embodiment and accordingly, the same effect can be achieved from the sixth embodiment as from the first embodiment.

Figure 14:
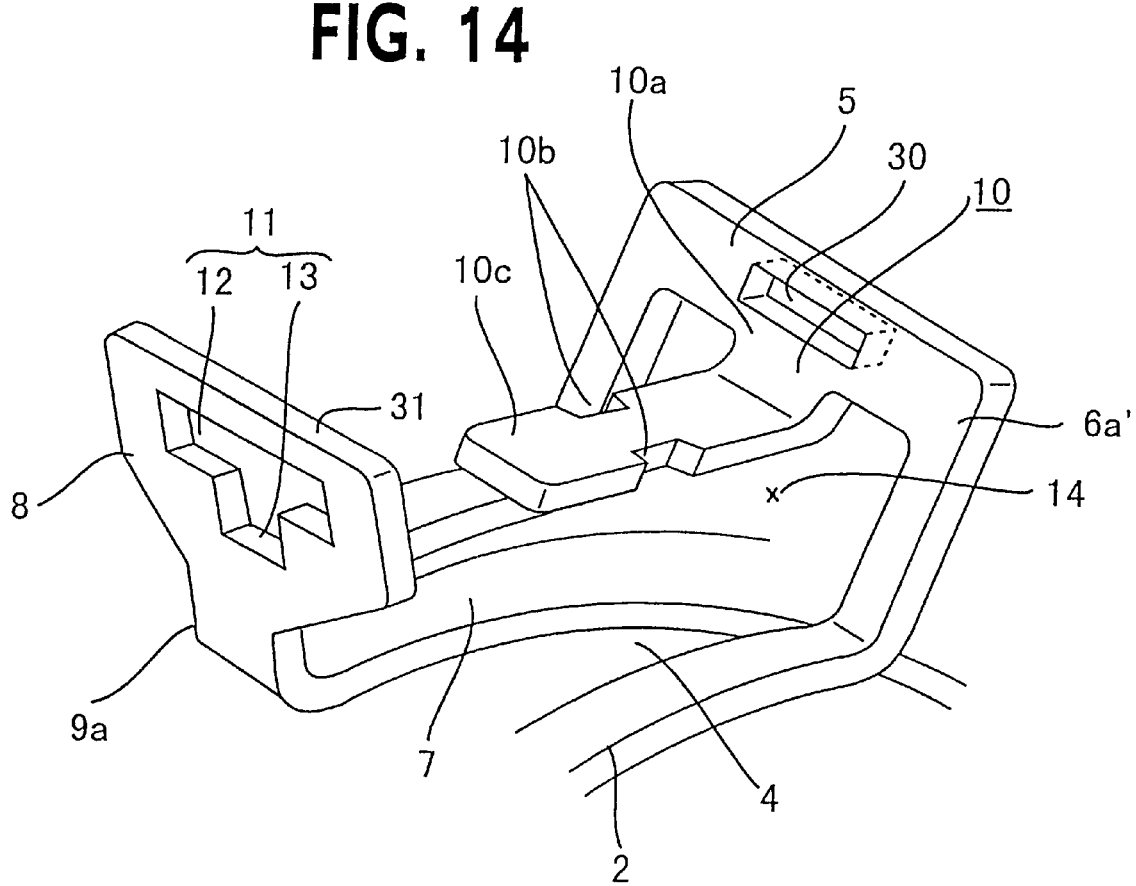
FIG. 14 is a view similar to FIG. 3, showing the hose clip of a seventh embodiment in accordance with the invention.
Figure 15:
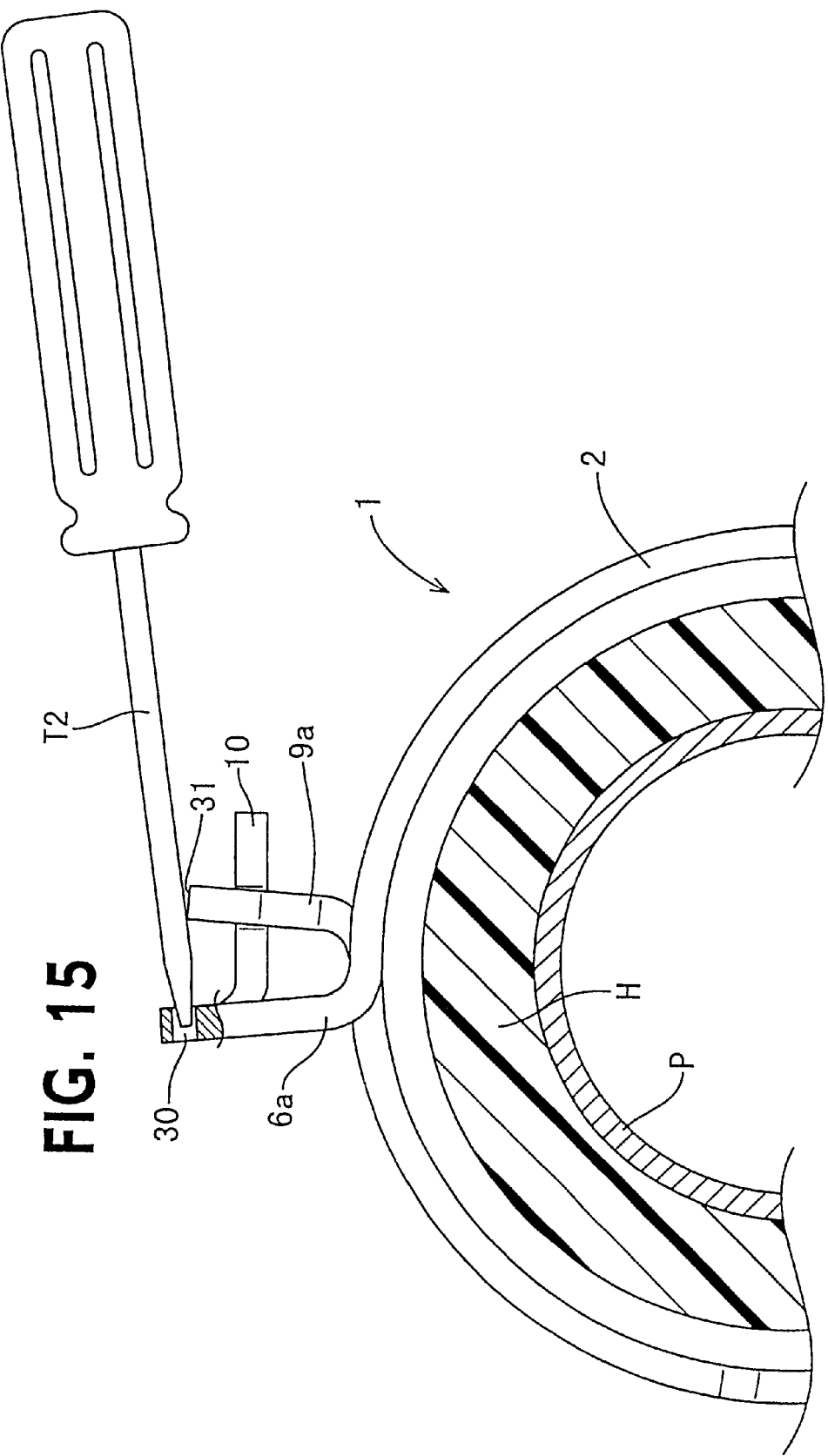
FIG. 15 is a partial perspective view of the protrusion engaging the opening, showing the work for releasing the hose clip from the spread state.

FIGS. 14 and 15 show a seventh embodiment of the invention. In the seventh embodiment, the first grip 6a of the hose clip 1 of the first embodiment is modified so that the protrusion 10 can be disengaged from the locking opening 11 by a bar-shaped releasing tool T2 such as a screw driver as well as by the releasing tool T such as the pliers. More specifically, the first grip 6a' in the seventh embodiment has a slightly larger height than the first grip 6a in the first embodiment. The first grip 6a' has a through hole 30 formed in an upper portion thereof. The distal end of the releasing tool T2 is inserted into the hole 30. The hole 30 constitutes a point of application in the invention.

In order that the protrusion 10 may be disengaged from the locking opening 11 in the seventh embodiment, the middle portion of the screw driver is applied to an upper end 31 (a fulcrum in the invention) of the second grip 9a from above. The distal end of the screw driver is inserted into the hole 30 of the first grip 6a. When the screw driver or the right-hand end thereof is pivoted downward, the first grip 6a is displaced upward relative to the second grip 9a. As a result, the protrusion 10 disengages from the opening 11 in the same manner as in the first embodiment. The remaining construction of the hose clip of the seventh embodiment is the same as that of the first embodiment and accordingly, the same effect can be achieved from the seventh embodiment as from the first embodiment.

Figure 16:
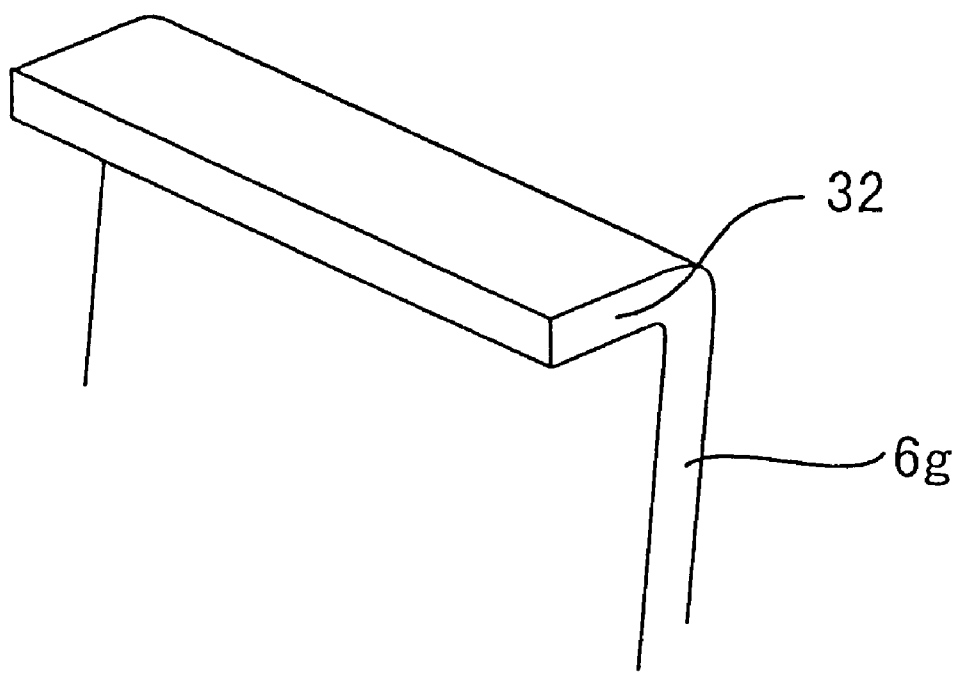
FIG. 16 is a partial perspective view of the first grip of the hose clip of an eighth embodiment in accordance with the invention.

FIG. 16 shows an eighth embodiment of the invention. The hose clip of the eighth embodiment differs from that of the seventh embodiment in that an upper end of the first grip 6g is bent at right angles toward the second grip (not shown) to be formed into a receiving wall 32 as shown in FIG. 16. The distal end of the releasing tool T2 is engaged with the wall 32. The other construction of the hose clip of the eighth embodiment is the same as of the seventh embodiment and accordingly, the same effect can be achieved from the eighth embodiment as from the seventh embodiment.

Figure 17:
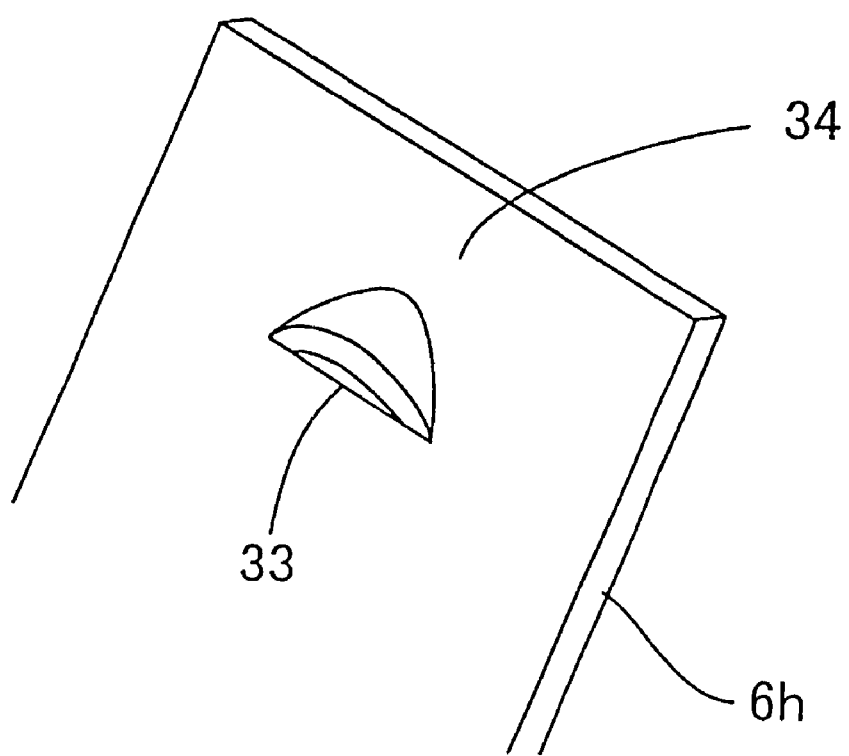
FIG. 17 is a view similar to FIG. 16, showing the hose clip of a ninth embodiment in accordance with the invention.

FIG. 17 shows a ninth embodiment of the invention. The hose clip of the ninth embodiment differs from that of the seventh embodiment in that the upper end of the first grip 6h has a horizontal slit 33 as shown in FIG. 17 and a portion of the first grip 6h over the slit 33 is knocked out toward the second grip (not shown) to be formed into a receiving projection 34. The distal end of the tool T2 is engaged with the projection 34. The remaining construction of the hose clip of the ninth embodiment is the same as that of the seventh embodiment and accordingly, the same effect can be achieved from the ninth embodiment as from the seventh embodiment.

The foregoing description and drawings are merely illustrative of the principles of the present invention and are not to be interpreted in a limiting sense. Various changes and modifications will become apparent to those of ordinary skill in the art. All such changes and modifications are seen to fall within the scope of the invention as defined by the appended claims.

What is claimed is:

1. A hose clip for clamping a hose, comprising:
   a clamping body formed by bending a band-shaped spring plate into a generally circular form such that said body is operable to clamp the hose when deformed into a reduced state due to an inherent spring force thereof, said body having a first end and a second end;
   a first grip provided at said first end of said body so as to extend radially outward from said body;
   a second grip provided at said second end of said body so as to extend radially outward from said body and so as to oppose said first grip;
   a locking opening formed in said second grip, said locking opening including a main opening section and a generally rectangular recess in a lower edge of said main opening section, said recess having a width smaller than a width of said main opening section; and
   a locking protrusion protruding from said first grip toward said second grip for extending through and engaging said locking opening, said locking protrusion having a notch in at least one side thereof so as to form a throat section to be fitted into said recess and a tab portion at a distal end of said locking protrusion, wherein when said locking protrusion engages said locking opening, said first grip and said second grip are close to each other such that said body is held in a spread state, said locking protrusion being adapted to disengage from said locking opening when said first grip and said second grip are displaced radially relative to each other, said first grip being shaped so as to define a releasing space below said locking protrusion so that a releasing tool can penetrate through the releasing space to release said locking protrusion from engagement with said locking opening.

2. The hose clip of claim 1, wherein said first end of said body has a hole including a first portion having a width gradually increasing toward said first end and a second portion having a uniform width over a predetermined length, said second portion of said hole extending radially so as to form a standing portion serving as said first grip.

3. The hose clip of claim 2, wherein said body has two generally triangular holes arranged so that said body generates a substantially uniform clamping force against a circumference of the hose.

4. The hose clip of claim 1, wherein said second grip has a chamfered guide face in a lower edge of said locking opening so as to oppose said first grip when said first grip is disengaged from said second grip.

5. The hose clip of claim 1, wherein said distal end of said locking protrusion is bent obliquely in a generally radial direction with respect to said body.

6. The hose clip of claim 1, wherein said tab portion has a claw formed on each side thereof so as to form a pair of claws, said claws being operable to engage and disengage from an outer side of a lower edge of said locking opening.

7. The hose clip of claim 1, wherein one of said first grip and said second grip has an upper end serving as a fulcrum for receiving a middle portion of a generally bar-shaped releasing tool, the other one of said first grip and said second grip having an upper end serving as an application point for a distal end of the releasing tool to engage, said other one of said first grip and said second grip being radially displaced when the releasing tool is pivoted about the fulcrum.

8. The hose clip of claim 7, wherein said other one of said first grip and said second grip has a hole formed in an upper end thereof for receiving a distal end of the releasing tool inserted therein.

9. The hose clip of claim 7, wherein said other one of said first grip and said second grip includes a receiving wall formed by bending an upper end thereof toward said one of said first grip and said second grip such that a distal end of the releasing tool can engage said receiving wall.

10. The hose clip of claim 7, wherein said other one of said first grip and said second grip includes a receiving projection projecting from an upper end thereof toward said one of said first grip and said second grip such that a distal end of the releasing tool can engage said receiving projection.

11. The hose clip of claim 1, wherein said locking protrusion has a notch in each side thereof so as to form a throat section.

12. The hose clip of claim 11, wherein said recess is located at a center of said lower edge of said main opening section.

13. The hose clip of claim 1, wherein said locking protrusion has a notch in only one side thereof so as to form a throat section, and said recess is located at an end of said lower edge of said main opening section.

14. A hose clip for clamping a hose, comprising:

a clamping body formed by bending a band-shaped spring plate into a generally circular form such that said body is operable to clamp the hose when deformed into a reduced state due to an inherent spring force thereof, said body having a first end and a second end;

a first grip provided at said first end of said body so as to extend radially outward from said body;

a second grip provided at said second end of said body so as to extend radially outward from said body and so as to oppose said first grip;

a locking opening formed in said second grip and having a projection formed on a lower edge thereof; and a locking protrusion protruding from said first grip toward said second grip for extending through and engaging said locking opening, said locking protrusion having a hole in a distal end thereof for engaging said projection of said locking opening, wherein when said locking protrusion engages said locking opening, said first grip and said second grip are close to each other such that said body is held in a spread state, said locking protrusion being adapted to disengage from said locking opening when said first grip and said second grip are displaced radially relative to each other, said first grip being shaped so as to define a releasing space below said locking protrusion so that a releasing tool can penetrate through the releasing space to release said locking protrusion from engagement with said locking opening.

15. The hose clip of claim 14, wherein said distal end of said locking protrusion is bent obliquely in a generally radial direction with respect to said body.

16. The hose clip of claim 14, wherein one of said first grip and said second grip has an upper end serving as a fulcrum for receiving a middle portion of a generally bar-shaped releasing tool, the other one of said first grip and said second grip having an upper end serving as an application point for a distal end of the releasing tool to engage, said other one of said first grip and said second grip being radially displaced when the releasing tool is pivoted about the fulcrum.

17. The hose clip of claim 16, wherein said other one of said first grip and said second grip has a hole formed in an upper end thereof for receiving a distal end of the releasing tool inserted therein.

18. The hose clip of claim 16, wherein said other one of said first grip and said second grip includes a receiving wall formed by bending an upper end thereof toward said one of said first grip and said second grip such that a distal end of the releasing tool can engage said receiving wall.

19. The hose clip of claim 16, wherein said other one of said first grip and said second grip includes a receiving projection projecting from an upper end thereof toward said one of said first grip and said second grip such that a distal end of the releasing tool can engage said receiving projection.

20. A hose clip for clamping a hose, comprising:

a clamping body formed by bending a band-shaped spring plate into a generally circular form such that said body is operable to clamp the hose when deformed into a reduced state due to an inherent spring force thereof, said body having a first end and a second end;

a first grip provided at said first end of said body so as to extend radially outward from said body;

a second grip provided at said second end of said body so as to extend radially outward from said body and so as to oppose said first grip;

a locking opening formed in said second grip and having a pair of grooves formed in an outside of a lower edge thereof; and a locking protrusion protruding from said first grip toward said second grip for extending through and engaging said locking opening, said locking protrusion having a downwardly extending hook formed on each side of a distal end thereof such that each hook of said locking protrusion can engage one of said grooves in said locking opening, wherein when said locking protrusion engages said locking opening, said first grip and said second grip are close to each other such that said body is held in a spread state, said locking protrusion being adapted to disengage from said locking opening when said first grip and said second grip are displaced radially relative to each other, said first grip being shaped so as to define a releasing space below said locking protrusion so that a releasing tool can penetrate through the releasing space to release said locking protrusion from engagement with said locking opening.

21. The hose clip of claim 20, wherein each hook has an inclined lower end so that a height thereof is gradually reduced toward said distal end of said protrusion.

22. The hose clip of claim 20, wherein one of said first grip and said second grip has an upper end serving as a fulcrum for receiving a middle portion of a generally bar-shaped releasing tool, the other one of said first grip and said second grip having an upper end serving as an application point for a distal end of the releasing tool to engage, said other one of said first grip and said second grip being radially displaced when the releasing tool is pivoted about the fulcrum.

23. The hose clip of claim 22, wherein said other one of said first grip and said second grip has a hole formed in an upper end thereof for receiving a distal end of the releasing tool inserted therein.

24. The hose clip of claim 22, wherein said other one of said first grip and said second grip includes a receiving wall formed by bending an upper end thereof toward said one of said first grip and said second grip such that a distal end of the releasing tool can engage said receiving wall.

25. The hose clip of claim 22, wherein said other one of said first grip and said second grip includes a receiving projection projecting from an upper end thereof toward said one of said first grip and said second grip such that a distal end of the releasing tool can engage said receiving projection.

26. A hose clip for clamping a hose, comprising:

a clamping body formed by bending a band-shaped spring plate into a generally circular form such that said body is operable to clamp the hose when deformed into a reduced state due to an inherent spring force thereof, said body having a first end and a second end;

a first grip provided at said first end of said body so as to extend radially outward from said body;

a second grip provided at said second end of said body so as to extend radially outward from said body and so as to oppose said first grip;

a locking opening formed in said second grip; and a locking protrusion protruding from said first grip toward said second grip for extending through and engaging said locking opening, said locking protrusion having a distal end including a spring portion folded obliquely downward and deformable upward and downward such that said spring portion can engage an outside of a lower edge of said locking opening, wherein when said locking protrusion engages said locking opening, said first grip and said second grip are close to each other such that said body is held in a spread state, said locking protrusion being adapted to disengage from said locking opening when said first grip and said second grip are displaced radially relative to each other, said first grip being shaped so as to define a releasing space below said locking protrusion so that a releasing tool can penetrate through the releasing space to release said locking protrusion from engagement with said locking opening.

27. The hose clip of claim 26, wherein one of said first grip and said second grip has an upper end serving as a fulcrum for receiving a middle portion of a generally bar-shaped releasing tool, the other one of said first grip and said second grip having an upper end serving as an application point for a distal end of the releasing tool to engage, said other one of said first grip and said second grip being radially displaced when the releasing tool is pivoted about the fulcrum.

28. The hose clip of claim 27, wherein said other one of said first grip and said second grip has a hole formed in an upper end thereof for receiving a distal end of the releasing tool inserted therein.

29. The hose clip of claim 27, wherein said other one of said first grip and said second grip includes a receiving wall formed by bending an upper end thereof toward said one of said first grip and said second grip such that a distal end of the releasing tool can engage said receiving wall.

30. The hose clip of claim 27, wherein said other one of said first grip and said second grip includes a receiving projection projecting from an upper end thereof toward said one of said first grip and said second grip such that a distal end of the releasing tool can engage said receiving projection.

* * * * *